United States Patent
Scharmüller et al.

(10) Patent No.: US 8,690,179 B2
(45) Date of Patent: Apr. 8, 2014

(54) FIFTH WHEEL COUPLING

(76) Inventors: Josef Scharmüller, Fornach (AT); Josef Scharmüller, Jr., Fornach (AT)

(*) Notice: Subject to any disclaimer, the term of this patent is extended or adjusted under 35 U.S.C. 154(b) by 198 days.

(21) Appl. No.: 13/131,374

(22) PCT Filed: Nov. 9, 2009

(86) PCT No.: PCT/AT2009/000426
§ 371 (c)(1),
(2), (4) Date: Aug. 9, 2011

(87) PCT Pub. No.: WO2010/060125
PCT Pub. Date: Jun. 3, 2010

(65) Prior Publication Data
US 2013/0214511 A1    Aug. 22, 2013

(30) Foreign Application Priority Data
Nov. 28, 2008  (AT) ................. A 1861/2008

(51) Int. Cl.
*B62D 53/08* (2006.01)
(52) U.S. Cl.
USPC .......................................... 280/433; 290/511
(58) Field of Classification Search
USPC ..................... 280/433–441.2, 511
See application file for complete search history.

(56) References Cited

U.S. PATENT DOCUMENTS

| 1,929,220 | A |   | 10/1933 | Steinhauer |
|---|---|---|---|---|
| 2,093,761 | A |   | 9/1937 | Kramer |
| 2,120,415 | A |   | 6/1938 | Meyer |
| 2,168,101 | A |   | 8/1939 | Miller |
| 3,811,706 | A | * | 5/1974 | Tucker et al. ............ 280/407 |
| 3,909,033 | A |   | 9/1975 | Russell, Jr. |
| 4,143,885 | A | * | 3/1979 | Mahosky ............ 280/477 |
| 5,876,055 | A |   | 3/1999 | Fontaine |
| 7,581,746 | B2 | * | 9/2009 | Abate et al. ............ 280/422 |
| 7,878,525 | B2 | * | 2/2011 | Andersen ............ 280/439 |
| 2006/0255559 | A1 |   | 11/2006 | Abate et al. |

FOREIGN PATENT DOCUMENTS

| CN | 101100161 A | 1/2008 |
|---|---|---|
| CN | 201002489 Y | 1/2008 |
| DE | 200 18 903 U1 | 3/2001 |
| GB | 2 175 262 A | 11/1986 |
| JP | 10-147266 | 6/1998 |
| WO | WO 02/26552 A1 | 4/2002 |

* cited by examiner

Primary Examiner — Tony Winner
(74) Attorney, Agent, or Firm — Henry M Feiereisen LLC

(57) ABSTRACT

On a fifth wheel coupling (1) for coupling a tractor to a semitrailer, comprising a fifth wheel plate (2) for installation on the tractor and an engagement element (3) for installation on the semitrailer, wherein the fifth wheel plate (2) is designed to receive the engagement element (3), it is proposed to design the engagement element (3) to comprise a coupling ball (31) in order to increase the cross-country mobility of a team formed by the tractor and the semitrailer.

11 Claims, 5 Drawing Sheets

FIFTH WHEEL COUPLING

CROSS-REFERENCES TO RELATED APPLICATIONS

This application is the U.S. National Stage of International Application No. PCT/AT2009/1000426, filed Nov. 9, 2009, which designated the United States and has been published as International Publication No. WO 2010/060125 A1 and which claims the priority of Austrian Patent Application, Serial No. A 1861/2008, filed Nov. 28, 2008, pursuant to 35 U.S.C. 119(a)-(d).

BACKGROUND OF THE INVENTION

The invention relates to a fifth wheel coupling. Fifth wheel couplings, in particular mounted on a tractor unit or on the semitrailer, are part of an articulated lorry. Articulated lorries are transport vehicles which can be used flexibly and cost-effectively.

The articulated lorry comprises the tractor unit and the semitrailer coupled thereto. The articulated lorry can also be designated as a trailer combination. The tractor unit can also be designated as articulated vehicle. The semitrailer is a trailer without a front axle but usually with several rear axles. The semitrailer is also known under the designations articulated trailer, trailer or trailer. The fifth wheel coupling is located in front of the rearmost axle of the tractor unit when viewed in the direction of travel of the trailer combination. In such a manner, the tractor unit can support a part of the mass of the trailer.

A disadvantage with conventional articulated lorries is that these have low cross-country mobility, i.e. they rapidly come across their limits of use on uneven terrain.

SUMMARY OF THE INVENTION

It is the object of the invention to provide a fifth wheel coupling of the type specified initially which enables a high cross-country mobility of an articulated lorry.

According to the invention, this is achieved by a fifth wheel coupling for coupling a tractor unit to a semitrailer, including a fifth wheel plate for mounting on the tractor unit and an engagement element for mounting on the semitrailer, wherein the fifth wheel plate is configured to receive the engagement element, wherein the engagement element includes a coupling ball.

As a result of the coupling ball, the advantage is obtained that semitrailer and tractor unit are connected to one another so that they can be twisted relative to one another about at least one vertical axis and about at least one horizontal axis, with the result that a ball joint is formed by the fifth wheel coupling. This results in the advantage that the articulated lorry can also drive on uneven terrain and even on uneven terrain a secure coupling of tractor unit and semitrailer can be ensured.

The dependent claims which in the same way as patent claim 1 at the same time form a part of the description, relate to further advantageous embodiments of the invention.

BRIEF DESCRIPTION OF THE DRAWING

The invention is described in detail with reference to the appended drawings which merely show preferred embodiments as an example. In the figures.

DETAILED DESCRIPTION OF PREFERRED EMBODIMENTS

FIGS. 1 to 15 show at least parts or details of a preferred first embodiment of a fifth wheel coupling 1 for coupling a tractor unit to a semitrailer, comprising a fifth wheel plate 2 for mounting on the tractor unit and an engagement element 3 for mounting on the semitrailer, wherein the fifth wheel plate 2 is configured to receive the engagement element 3 at least in certain regions. In the fifth wheel coupling in order to improve the cross-country mobility of an articulated lorry formed from the tractor unit and the semitrailer, it is provided that the engagement element 3 comprises a coupling ball 31.

This enables the advantages specified initially and advantageous effects. It is advantageous if the tractor unit and coupled-on semitrailer can be twisted relative to one another in a predeterminable manner and can also be tilted relative to one another in a predeterminable manner. It is also advantageous if in the case of a predeterminable relative tilting, i.e. a twisting relative to one another about a horizontal axis, for example, by 10° between tractor unit and semitrailer, tractor unit and semitrailer can still be twisted relative to one another as conventionally. In this case, it is advantageous in particular if no excessive loadings occur on and/or in the fifth wheel coupling 1, whereby the stability of the fifth wheel coupling 1 can be increased.

By means of the fifth wheel coupling, forces, in particular tensile and cornering forces, can be reliably transmitted from the semitrailer to the tractor unit and in the converse direction of action.

The fifth wheel plate 2 is mounted on the tractor unit and can be fastened on the tractor unit, in particular screwed-on, by means of a supporting plate 20 embraced by the fifth wheel plate 2.

The engagement element 3 is mounted on the semitrailer and can in particular be screwed onto the semitrailer.

Fifth wheel plate 2 and/or engagement element 3 can comprise steel 3 or be formed substantially from steel.

In particular, it can be provided that the fifth wheel plate 2 comprises a ball cup 21, as is provided in the preferred first embodiment of the fifth wheel coupling 1. The ball cup 21 can substantially be configured in its shaping to be mirror-inverted with respect to the coupling ball 31, whereby the coupling ball 31 can reliably be received by the ball cup 21 and the coupling ball 31 can reliably be twisted in all directions in the ball cup 21, whereby the engagement element 3 engaging in the ball cup 21 can be rotated and tilted. It is advantageous in this case if in each of these engaging positions of the engagement element 3, forces can be reliably transferred from the tractor unit to the semitrailer and conversely.

For this purpose, it can advantageously be provided that the ball cup 21 is configured to be substantially hemispherical. The ball cup 21 thereby forms a hemispherical inner surface for receiving the spherical outer surface of the coupling ball 31.

The coupling between tractor unit and semitrailer can be ensured particularly reliably if the coupling cup 21 has a cylindrical region 212 adjoining the hemispherical region 211, as is provided in the preferred first embodiment of the fifth wheel coupling 1.

In an advantageous further development it can be provided that a sliding guide 22 for guidance of the coupling ball 31 to the ball cup 21 is located adjacent to the ball cup 21, as is provided in the preferred first embodiment of the fifth wheel coupling 1. In this way the guiding of the coupling ball 31 into the coupling cup 21 can be simplified. For coupling the tractor unit can be pushed backwards in the direction of the semitrailer standing by. At the same time, the coupling ball 31 can be guided easily into the sliding guide 22 which is broad at the edge and tapers to become narrower. By means of the sliding guide 22, the coupling ball 31 can be pushed further, substantially independently, in the direction of the ball cup 21 upon pushing the tractor unit further backwards.

In particular it can be provided that the fifth wheel plate 2 comprises a hold-down element 23, that the hold-down element 23 can be moved from a release position 230 into a holding position 231 and that the hold-down element 23 has a contact region 232 for contacting a coupling ball 31 located in the holding position 231 in the ball cup 21, as is provided in the preferred first embodiment of the fifth wheel coupling 1. The hold-down element 23 is thereby provided for securing the coupling ball 31 of a coupled position of the engagement element 3. The hold-down element 23 and the ball cup 21 are embraced by the fifth wheel plate 2, whereby the hold-down element 23 and the ball cup 21 are provided for mounting on the tractor unit and are mounted in the operating position on the tractor unit.

The coupling ball 31 fixed in this manner can, however, still twist in the ball cup 21, in particular can twist in substantially all possible directions. In this way the twistability and the inclinability of tractor unit to the semitrailer can still be ensured. At the same time, it can be provided in particular that the ball cup has a recess 25 for receiving a hold-down element 23 embraced by the fifth wheel plate 2, where the hold-down element 23 can be moved relative to the fifth wheel plate 2, in particular can be displaced and/or pivoted within the recess 25.

In this connection, it can be provided that the hold-down element 23 is mounted so that, when the hold-down element 23 is viewed from the side, it can rotate about a first bearing point 5 of a first bearing axis and can be fixed in the holding position 231 by means of a fixing element 4 at a second bearing point 6 of a second bearing axis, when the hold-down element 23 is viewed from the side. In this way, the hold-down element 23 can fix the coupling ball 31 on the one hand simply and on the other hand reliably in the coupled position, as is provided in the preferred first embodiment of the fifth wheel coupling 1. In the first embodiment of the fifth wheel coupling 1, it is provided for this purpose that the first bearing point 5 is formed by aligning openings in the fifth wheel plate 2 and hold-down element 23. For mounting, a bolt is inserted in these aligning openings, which bolt forms a bearing. For this purpose it is further provided in the preferred first embodiment of the fifth wheel coupling 1 that the second bearing point 6 is formed by further openings in the fifth wheel plate 2 and hold-down element 23 which further openings align in the holding position 231. The fixing element 4, in particular disposed longitudinally displaceably in the further openings, is inserted inside the further openings for fixing the hold-down element 23 in the holding position 231.

In particular, the first bearing axis can stand normally on a principal direction of movement, along which principal direction of movement substantially the coupling ball 31 can be moved inside the ball cup 21 during coupling and which principal direction of movement can in particular be disposed substantially normally on the supporting plate 20, preferably substantially vertically. In particular, the first bearing axis can be disposed parallel to the supporting plate 20, which supporting plate 20 can be disposed in particular substantially parallel to a horizontal, i.e. level, plane. In particular, the first bearing axis can be disposed substantially horizontally. The first bearing axis and the second bearing axis can advantageously be parallel to one another. The hold-down element 23 can therefore pivot in particular in a plane parallel to the principal direction of movement, preferably in a vertical, i.e. perpendicular plane. The pivoting movement of the hold-down element 23, in which the hold-down element 23 twists about the first bearing point 5, and the transverse movement of the coupling ball 31 can interact particularly reliably along the principal direction of movement.

In another advantageous embodiment, which is not shown, the hold-down element 23 can be guided by means of a longitudinal guide and guided towards the coupling ball 31 by means of an actuator or moved away from this. The longitudinal guide can thereby replace the first bearing point 5 and the actuator can replace the second bearing point 6.

In a further advantageous embodiment, which is not shown, it can be provided that the hold-down element 23 is fixed in the holding position 231 by means of a pivotable flap, for which the flap is located in a first flap position. For releasing the movement of the hold-down element 23, the flap can be pivoted from the first flap position, which can be accomplished by remote control or remote action, and then the hold-down element 23 can move, in particular, pivot into the release position 230. In the release position 230, it can be provided that the flap is located in a second flap position in which second flap position the flap is already to be pivoted back into the first flap position substantially without further assistance as soon as the hold-down element 23 located back in the holding position 231 To this end, the flap can be pre-tensioned in the second flap position. In particular, the flap can be remote-controlled.

In particular, it can be provided that the contact region 232 is configured substantially in a sickle shape and in the holding position 231 is located in certain sections in the hemispherical region of the ball cup 21, as is provided in the preferred first embodiment of the fifth wheel coupling 1. It is advantageous in this case that the hold-down element 23 in the holding position 231 is particularly well suited to complete the contour of the ball cup 21.

The sickle-shaped contour region 232 in combination with the suitable position of the first bearing point 5 can advantageously have the effect that when lowering the engagement element 3 for coupling, the hold-down element 23 is turned by the coupling ball 31 about the first bearing point 5 into the holding position 231, in particular is turned without further assistance. In such a manner it can advantageously be ensured that the hold-down element 23 is moved into the holding position 231 without further assistance, whereby the process of coupling the semitrailer to the tractor unit can be simplified.

In a further development of the contact region 232, it can be provided that merely a partial region is configured to be sickle-shaped. In this case, it is advantageous that the geometry of the contact region 232 can be produced simply, wherein nevertheless the previous advantage, that the process of coupling the semitrailer to the tractor unit can be configured particularly simply, can be ensured.

In an advantageous further development, in particular of the first embodiment of the fifth wheel coupling 1, it can be provided that a deformation element 51 is disposed in the region of the first bearing point 5. It is advantageous in this case that in such a manner, impacts, occurring during movement of the trailer combination, i.e. force impulses, can be cushioned by the deformation element 51, whereby the occurrence of brief, excessive stress peaks in the fifth wheel coupling 1 can be avoided. The life of the fifth wheel coupling 1 can advantageously be increased in this way.

In this connection, it can be provided in particular that this deformation element 51 is configured as an elastic ring. This enables the particularly simple and space-saving mounting of the deformation element 51 in the region of the first bearing point 5.

In a particularly advantageous manner, as shown in FIGS. 1, 2, 3, 5, 7, 9, 10 and 11, an actuating device 7 is provided for actuating the fixing element 4, wherein the actuating device 7 can be located in a fixing position 71, a loose position 72 and a ready position 73 and that an apparatus 8 is provided for bringing the actuating device 7 from the loose position 72 into the ready position 73 when bringing the hold-down element 23 from the holding position 231 into the release position 230. In this case, the respective position of the fifth wheel coupling 1 can also advantageously be identified from the, clearly visible, position of the actuating device 7. The fixing element 4 can particularly advantageously be coupled to the actuating device 7 and thereby moved relatively jointly with the actuating device 7, in particular displaced relative to the hold-down element 23. The fixing device 4 can substantially be configured as a bolt as is the case in the first embodiment of the fifth wheel coupling 1.

Figure 1:
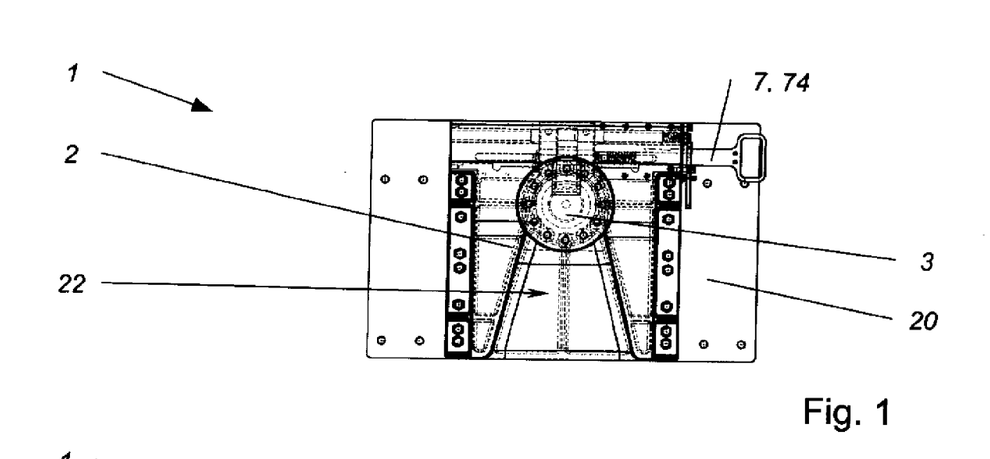
FIG. 1 shows the fifth wheel coupling of a preferred first embodiment in a plan view.
Figure 2:
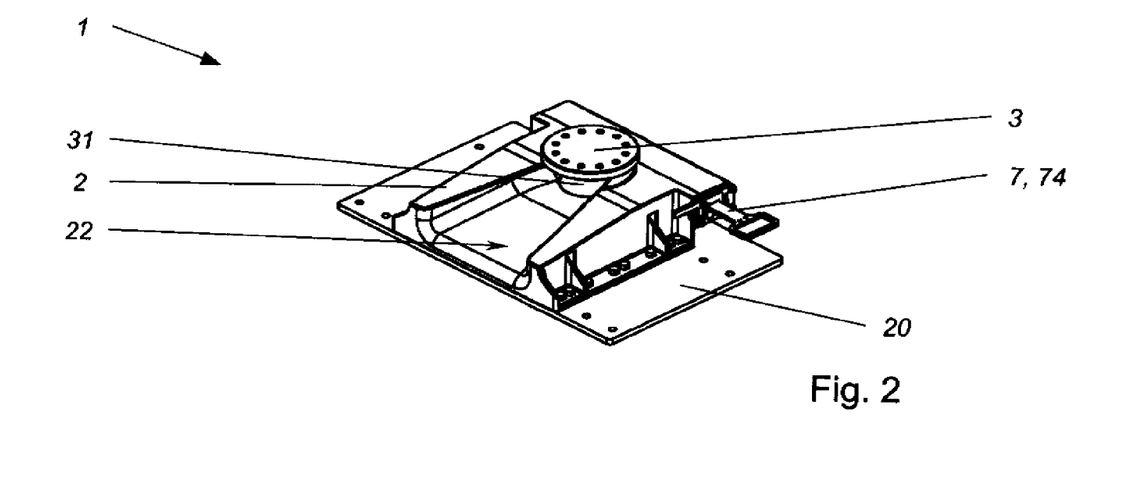
FIG. 2 shows the fifth wheel coupling according to FIG. 1 in an oblique view.
Figure 3:
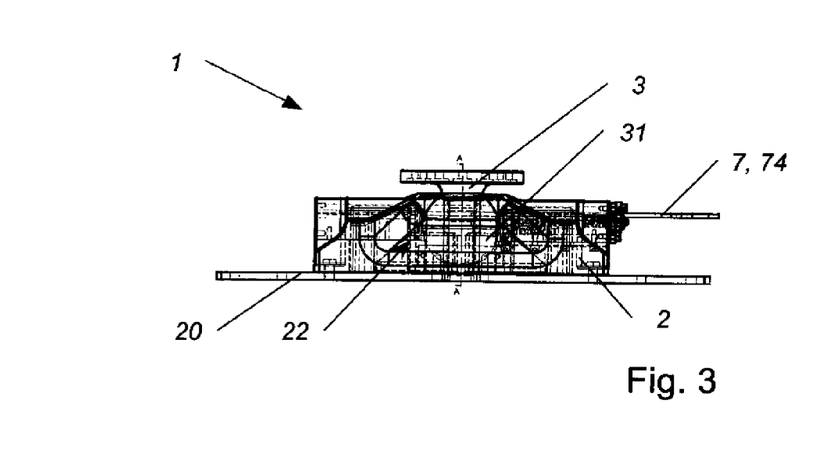
FIG. 3 shows the fifth wheel coupling according to FIG. 1 in a schematic front view in a first coupled and fixed position.
Figure 4:
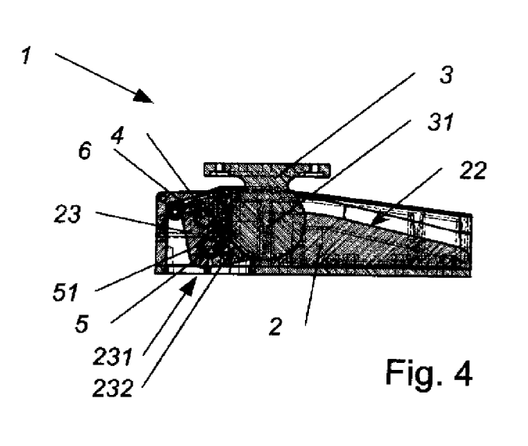
FIG. 4 shows the fifth wheel coupling according to FIG. 1 in a schematic cutaway side view in the position according to FIG. 3.
Figure 5:
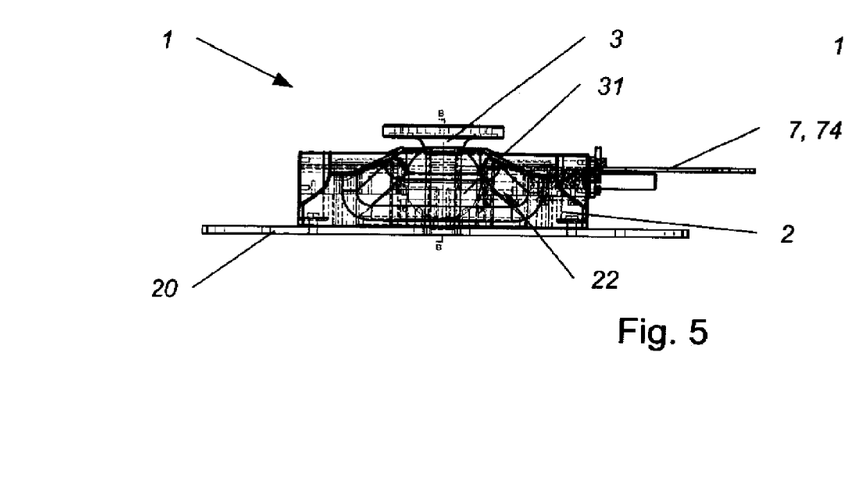
FIG. 5 shows the fifth wheel coupling according to FIG. 1 in a schematic front view in a second coupled and released position.
Figure 6:
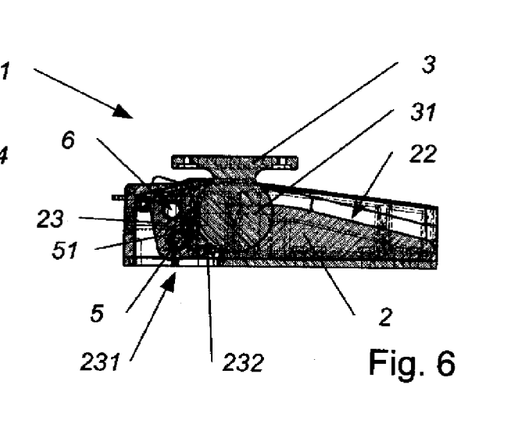
FIG. 6 shows the fifth wheel coupling according to FIG. 1 in a schematic cutaway side view in the position according to FIG. 5.
Figures 7, 8, 9:
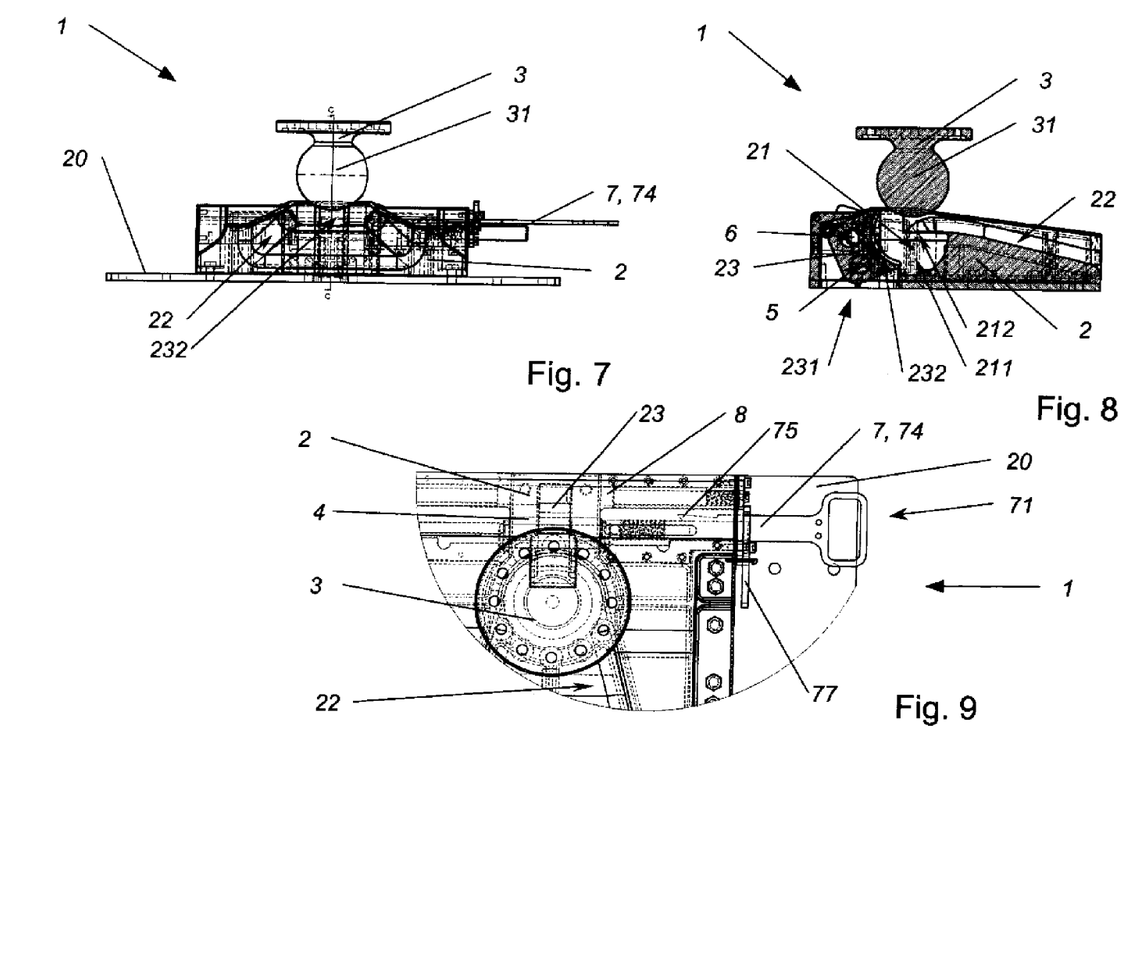
FIG. 7 shows the fifth wheel coupling according to FIG. 1 in a schematic front view in a third decoupled position.
FIG. 8 shows the fifth wheel coupling according to FIG. 1 in a cutaway schematic side view in the position according to FIG. 7.
FIG. 9 shows a detail of the fifth wheel coupling according to FIG. 1 in plan view, wherein an actuating device comprising a hand lever is shown in detail, wherein the fifth wheel coupling is located in the first, coupled and fixed position and the actuating device is located in its fixing position.

The fixing position 71 in the first embodiment of the fifth wheel coupling 1 is shown in detailed view in FIG. 9. In the fixing position 71 the hold-down element 23 is located in the holding position 231 and the hold-down element 23 is thereby torsionally fixed relative to the first bearing point 5, for which the fixing element 4 is fixed at the second bearing point 6 by means of the actuating device 7. The loose position 72 is shown in detailed view in FIG. 10. In the loose position 72 the hold-down element 23 can be located both in the holding position 231, in the release position 230 or in an intermediate position and the hold-down element 23 can be twisted about the first bearing point 5, for which the fixing element 4 is located at a distance from the second bearing point 6 by means of the actuating device 7. The actuating device 7 can in particular comprise a hook 75 for hooking onto the fifth wheel coupling 1. The actuating device 7 can be brought manually into the loose position 72 and after hooking in, can remain in the loose position 72 until the hooking in is released.

Figure 10:
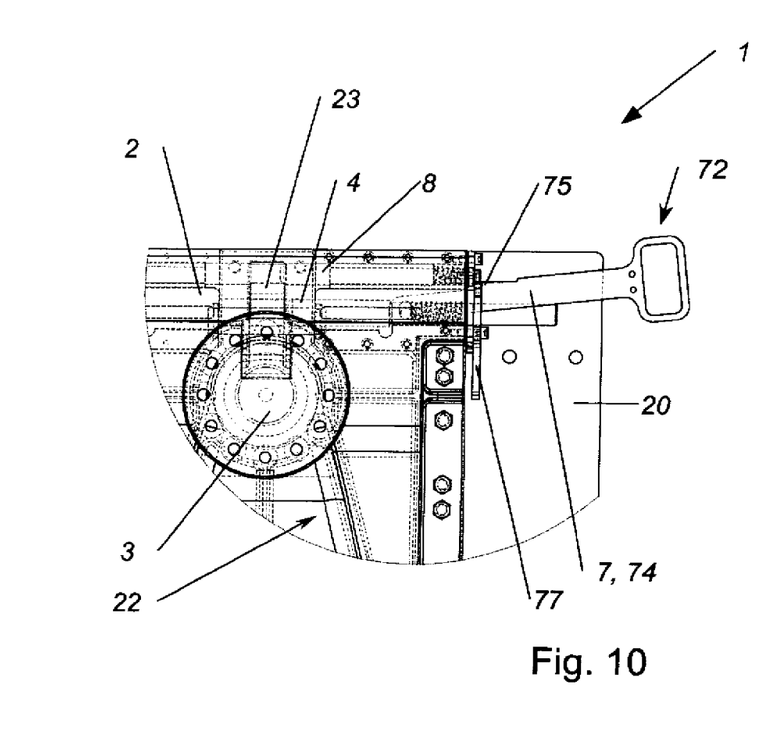
FIG. 10 shows the detail according to FIG. 9, wherein the fifth wheel coupling is located in the second, coupled and released position and the actuating device is located in a loose position.

In order to guide the actuating device 7 from its fixing position 71 into its loose position 72, this can be displaced substantially longitudinally, in particular manually, pulled out from the fifth wheel plate 2 in some regions and hooked onto the fifth wheel plate 2 by means of the hook 75. At the same time, it can be provided in particular that the fixing element 4 is pulled out, at least in some regions, from the openings forming the second bearing point 6.

Figure 11:
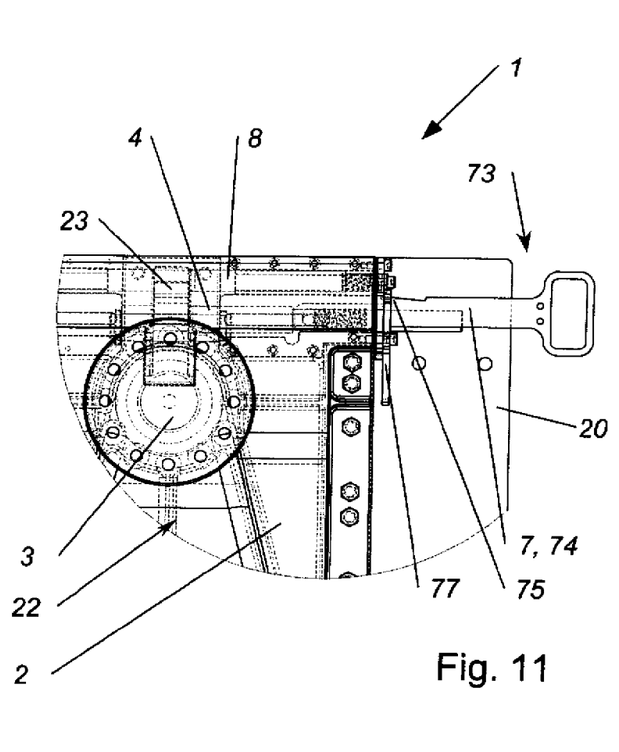
FIG. 11 shows the detail according to FIG. 9, wherein the fifth wheel coupling is located in the third, decoupled position and the actuating device is located in a ready position.

The ready position 73 is shown in detailed view in FIG. 11. In the ready position 73 the hook 75 can be released from the fifth wheel coupling 1 whereby the actuating device 7 can be moved, in particular is arranged longitudinally displaceably. In the ready position 73 it can be provided in particular that the fixing element 4 abuts against a surface of the hold-down element 23 and is pre-tensioned by means of the actuating device 7 for pressing forward into the further openings forming the bearing point 6. In this case, the position of the actuating device 7 is substantially determined by the fixing element 4 abutting against a surface of the hold-down element 23 and in such a manner preventing any further pushing of the actuating device 7 in the direction of the hold-down element 23.

In the ready position 73 the hold-down element 23 can be located both in the holding position 231, in the release position 230 or in an intermediate position and the hold-down element 23 can also be twisted about the first bearing point 5. It is advantageous in this case that the fixing element 4 can thereby penetrate, in particular without further assistance, into the further openings and the hold-down element 23 can be positionally fixed at the second bearing point 6 in such a manner as soon as the hold-down element 23 is located in its holding position 231. At the same time, it is advantageous that in such a manner the hold-down element 23 can be securely mounted in a torsionally fixed manner both at the first bearing point 5 and at the second bearing point 6, whereby the hold-down element 23 is reliably fixed in its holding position 231 and consequently the hold-down element 23 reliably fixes the coupling ball 31 inside the ball cup 21.

In order to guide the actuating device 7 from its loose position 72 into its ready position 73, this can be released from the loose position 72 hooked on the fifth wheel plate 2. This can take place in a particularly advantageous manner if means for releasing the hook 75 from the fifth wheel coupling 1 are provided on the hold-down element 23 and/or on the actuating device 7. As a result, when the hold-down element 23 and actuating device 7 contact, the hook 75 can easily be released from the fifth wheel plate 2 without further assistance and the actuating device 7 can be located in the ready position 73, in particular without further assistance.

In a further development, it can be provided that the further openings forming the second bearing point 6, instead of being hole-shaped, can be angular in some regions, in particular four-cornered, preferably square. In this case, the fixing element 4 can also be configured to be geometrically fitting to this, i.e. mirror-inverted and can consist of a corresponding three-dimensional moulding.

The actuating device 7 can preferably comprise a hand lever 74, as is provided in the preferred first embodiment the fifth wheel coupling 1. It is advantageous in this case that the actuating device 7 can be actuated particularly simply manually.

It can preferably be provided that the actuating device 7 comprises at least one fluid element, in particular a hydraulic cylinder and/or a pneumatic cylinder. In such a manner the position of the actuating device 7 can be controlled remotely particularly simply, for example, from a cab of an articulated lorry.

In an advantageous further development, a securing element 77 can be provided in the fifth wheel coupling 1 for securing the fixing position 71 of the actuating device 7. The securing element 77 can thereby block the movement of the actuating device 7 from the fixing position 71 into the loose position 72 or into the ready position 73.

It can advantageously be provided that for de-blocking the actuating device 7 the securing element 77 must be moved, in particular pivoted, from a blocking position. In this case, the securing element 77 can be configured as a pivot lever.

In this connection, it can be provided that if the actuating device 7 is brought from the ready position 73 into the fixing position 71, which can be accomplished substantially by itself in particular without further assistance in a suitable position of the hold-down element 23, the securing element 77 can be moved, in particular pivoted, without further assistance into a position which blocks the actuating device 7 in the fixing position 71. In particular, this movement, in particular this pivoting, into the blocking position of the securing element 77 can take place due to gravity. In this position, the securing element 77 can again be secured against an unintentional movement and/or pivoting of the securing element 77 from the blocking position by means of a second securing, in particular by means of cotter pin securing.

Figure 12:
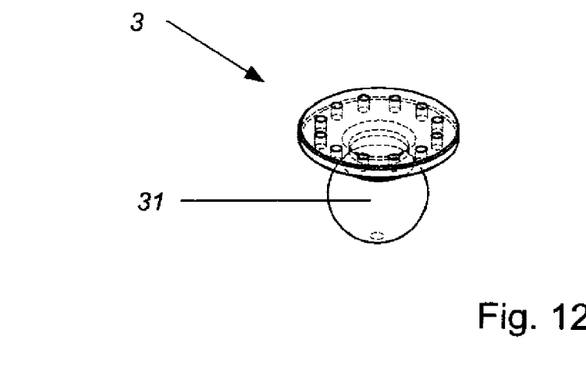
FIG. 12 shows the engagement element according to FIG. 1 in an oblique view.

FIG. 12 shows the engagement element 3 of the first embodiment of the fifth wheel coupling 1 which comprises the coupling ball 31.

Figure 13:
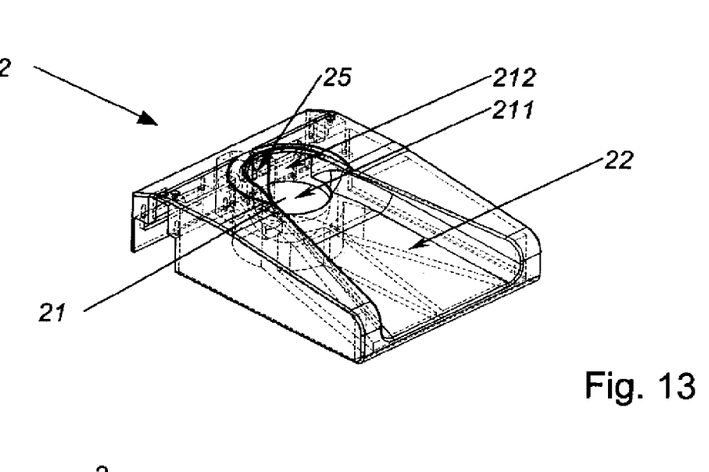
FIG. 13 shows the fifth wheel plate according to FIG. 1 in an oblique view.
Figure 14:
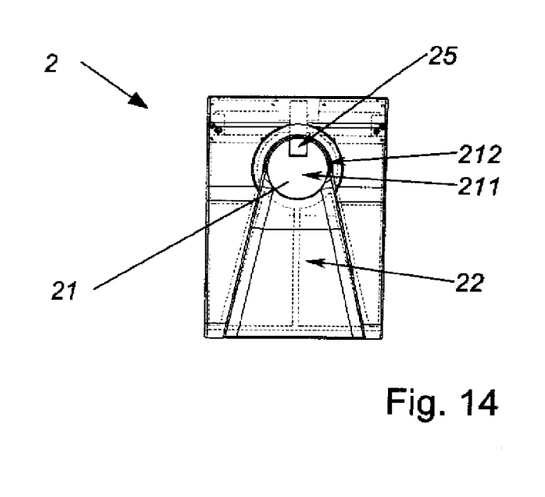
FIG. 14 shows the fifth wheel plate shown in FIG. 13 in plan view.
Figure 15:
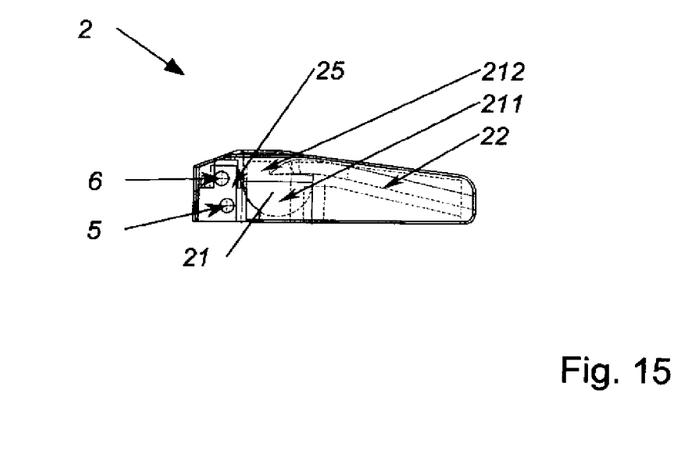
FIG. 15 shows the fifth wheel plate shown in FIG. 13 in side view.

FIGS. 13 to 15 show different views of the fifth wheel plate 2 of the first embodiment of the fifth wheel coupling 1, where in particular the recess 25 for receiving the hold-down element 23 embraced by the fifth wheel plate 2 can be seen in these figures.

In an advantageous further development, in particular of the first embodiment of the fifth wheel coupling 1, it can be provided that the fifth wheel coupling 1 has means for release at a predetermined tilt angle between tractor unit and semitrailer. With such means it can be ensured that if either tractor unit or semitrailer tip over sideways, the fifth wheel coupling 1 is released in a loosening manner and therefore the semitrailer or the tractor unit do not tip over as well. This means for release can be designated as release means and can in particular be configured as a plastic insert, in particular as a rubber insert, thermosetting plastic insert and/or thermoplastic insert in the ball cup 21 and/or on the hold-down element 23. The plastic insert can advantageously deform and/or break in a predeterminable manner such that the coupling ball 31 can be removed from the fifth wheel plate 2 despite the holding position 231 of the hold-down element 23. For example, if the semitrailer topples down a slope, it can be rendered possible that the tractor unit is not pulled down with the semitrailer. In such a manner serious accidents can be prevented and persons protected since in the case of an accident tractor unit and semitrailer are usually separated from one another.

In particular, it can be provided that when viewed in the mounting position, the first bearing point 5 and/or the second bearing point 6 lie underneath the central point of a ball inscribed in the ball cup 21. In the first embodiment of the fifth wheel coupling 1, it is provided that the first bearing point 5 lies significantly below the central point of this inscribed ball and that the second bearing point 6 lies approximately at the same height as the central point of this inscribed ball. This advantageous arrangement can bring with it an additional emergency safeguard: in an emergency, i.e. under above-average force loading, the second bearing point 6 can form a pivot point for turning the hold-down element 23 if the first bearing point 5 releases the hold-down element 23 at least in part. To this end the first bearing point 5 can, for example, comprise the highly deformable rubber element and/or a predetermined breaking point, which predetermined breaking point can be provided in the bolt and/or in the plastic insert. The hold-down element 23 can then turn about the second bearing point 6. If the second bearing point 6 lies below the central point of the inscribed ball, the hold-down element 23 can then pivot away from the ball during withdrawal of the coupling ball 31 from the ball cup 21 and facilitate the withdrawal. In such a manner the coupling ball 31 can be pulled from the ball cup 21 with predeterminable force, whereby the emergency safeguard can be ensured.

Further embodiments according to the invention exhibit only some of the described features, where each combination of features, in particular of different embodiments described can be provided.

What is claimed is:

1. A fifth wheel coupling for coupling a tractor unit to a semitrailer, said fifth wheel coupling comprising:
    an engagement element for mounting on the semitrailer, said engagement element including a coupling ball, and
    a fifth wheel plate for mounting on the tractor unit, said fifth wheel plate being configured to receive the engagement element and including a ball cup, said fifth wheel plate comprising a hold-down element which is movable from a release position to a holding position, said hold-down element having a contact region for contacting the coupling ball, when the hold-down element is in the holding position and the coupling ball is located in the ball cup, and being mounted for rotation about a first bearing point;
    a fixing element to secure the hold-down element in the holding position at a second bearing point;
    an actuating device constructed for actuation of the fixing element and being movable between a fixing position, a loose position, and a ready position; and
    an apparatus for moving the actuating device from the loose position into the ready position when the hold-down element is moved from the holding position to the release position.

2. The fifth wheel coupling of claim 1, further comprising a sliding guide located adjacent to the ball cup for guidance of the coupling ball to the ball cup.

3. The fifth wheel coupling of claim 1, wherein the ball cup has a substantially hemispherical region.

4. The fifth wheel coupling of claim 3, wherein the ball cup has a cylindrical region adjoining the hemispherical region.

5. The fifth wheel coupling of claim 1, wherein the ball cup has a substantially hemispherical region, wherein the contact region of the hold-down element is configured substantially in a sickle shape and located in certain sections in the hemispherical region of the ball cup, when the hold-down element is in the holding position.

6. The fifth wheel coupling of claim 1, wherein at least one of the first bearing point and the second bearing point lies underneath a central point of a ball inscribed in the ball cup, when viewed in a mounting position.

7. The fifth wheel coupling of claim 1, further comprising a deformation element located in a region of the first bearing point.

8. The fifth wheel coupling of claim 7, wherein the deformation element is configured as an elastic ring.

9. The fifth wheel coupling of claim 1, wherein the actuating device comprises a hand lever.

10. The fifth wheel coupling of claim 1, wherein the actuating device comprises at least one fluid-operated element.

11. The fifth wheel coupling of claim 10, wherein the fluid-operated element is at least one of a hydraulic cylinder and a pneumatic cylinder.

* * * * *